(12) United States Patent
Bruchmann et al.

(10) Patent No.: US 8,466,250 B2
(45) Date of Patent: Jun. 18, 2013

(54) HIGH-FUNCTIONALITY POLYETHEROLS AND PREPARATION AND USE THEREOF

(75) Inventors: Bernd Bruchmann, Freinsheim (DE); Anna Cristadoro, Heppenheim (DE); Oihana Elizalde, Charlotte, NC (US); Angelika Maria Steinbrecher, Stuttgart (DE); Monika Haberecht, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/273,619

(22) Filed: Oct. 14, 2011

(65) Prior Publication Data
US 2012/0095162 A1 Apr. 19, 2012

Related U.S. Application Data

(60) Provisional application No. 61/393,970, filed on Oct. 18, 2010.

(51) Int. Cl.
*C09D 179/04* (2006.01)
*C08G 73/06* (2006.01)

(52) U.S. Cl.
USPC ............................................................ 528/44

(58) Field of Classification Search
None
See application file for complete search history.

(56) References Cited

U.S. PATENT DOCUMENTS

| 3,293,224 | A | * | 12/1966 | Fitz-William, Jr. | 528/226 |
| 3,477,996 | A | * | 11/1969 | Formaini | 528/289 |
| 4,557,949 | A | * | 12/1985 | Kurihara et al. | 427/244 |
| 5,770,650 | A |   | 6/1998 | McGee et al. | |
| 2010/0324261 | A1 | * | 12/2010 | Muelhaupt et al. | 528/425 |

FOREIGN PATENT DOCUMENTS

| DE | 29 04 979 A1 | 8/1979 |
| EP | 0 044 872 A1 | 2/1982 |
| WO | WO 02/36695 A1 | 5/2002 |
| WO | WO 02/36697 A1 | 5/2002 |
| WO | WO 2009/101141 A1 | 8/2009 |

OTHER PUBLICATIONS

U.S. Appl. No. 13/440,463, filed Apr. 5, 2012, Henningsen, et al.

\* cited by examiner

*Primary Examiner* — Randy Gulakowski
*Assistant Examiner* — Jeffrey Washville
(74) *Attorney, Agent, or Firm* — Oblon, Spivak, McClelland, Maier & Neustadt, L.L.P.

(57) ABSTRACT

The present invention relates to a process for preparing high-functionality polyethers having a Hazen color number of less than 500, by converting tris(hydroxyethyl) isocyanurate (THEIC) and one or more difunctional alcohols and/or modifying reagents with the aid of acidic catalysts. The present invention further relates to high-functionality polyethers having a color number of less than 10, obtainable by such a process, and to the use of these high-functionality polyethers as adhesion promoters, thixotropic agents, rheology modifiers of polymers, in printing inks, paints and coatings, or as units for preparation of polyaddition or polycondensation polymers.

19 Claims, No Drawings

HIGH-FUNCTIONALITY POLYETHEROLS AND PREPARATION AND USE THEREOF

CROSS-REFERENCE TO RELATED APPLICATIONS

This application claims the benefit of U.S. 61/393,970 filed Oct. 18, 2010.

The present invention relates to a process for preparing high-functionality polyethers having a Hazen color number of less than 500, measured to DIN ISO 6271, by converting tris(hydroxyethyl) isocyanurate (THEIC) and one or more difunctional alcohols and/or modifying reagents with the aid of acidic catalysts. The present invention further relates to high-functionality polyethers having a color number of less than 500, obtainable by such a process, and to the use of these high-functionality polyethers as adhesion promoters, thixotropic agents, rheology modifiers, as a constituent of printing inks, paints and coatings, or as units for preparation of polyaddition or polycondensation polymers.

Polyetherols are typically prepared from the reaction of water, alcohols or amines by ring-opening polymerization with alkylene oxides, for example with ethylene oxide, propylene oxide or butylene oxide, or mixtures thereof. Of industrial significance are polyetherols based on water, glycols, glycerol, trimethylolpropane, pentaerythritol or sugars as the starter molecule, which react with ethylene oxide, propylene oxide or ethylene oxide/propylene oxide mixtures to give linear diols or polyols of star-shaped structure. Such processes are explained, for example, in Becker/Braun, Kunststoff-Handbuch [Polymer Handbook] vol. 7, Polyurethane [Polyurethanes], Carl-Hanser-Verlag, Munich, 1993, pages 58-67.

For example, Huozhayao Xuebao 2007, 30 (6), pages 13-16, describes the reaction of THEIC with various epoxides by ring-opening polymerization by means of boron trifluoride catalysis to give polyfunctional polyethers. However, this synthesis is technically complex and does not lead to the highly branched polyethers that we have claimed.

The preparation of polyethers by homocondensation of THEIC has likewise been described. For example, U.S. Pat. No. 3,293,224 discloses the preparation of high-functionality polyethers under acidic catalysis to give oligomeric polyethers. The products thus obtained are solids which are glassy at room temperature, which can be converted to powder form by grinding. In addition to the high glass transition temperature, the polyethers are insoluble in nonpolar media and are of limited solubility in polar media. As a result of these restrictions, the products do not have wide usability.

Documents EP 44 872 and U.S. Pat. No. 4,557,949 (=DE 2904979) describe the production of semipermeable membranes, in which the polycondensation of THEIC, optionally in combination with further alcohols, in the presence of acidic catalysts, for example $H_2SO_4$, is applied to a substrate, for example glass or fabric. The reaction product thus obtained is crosslinked and water-insoluble, and is unsuitable for further reactions.

WO 2009/101141 describes the preparation of high-functionality polyetherols by reacting at least one trifunctional or higher-functionality alcohol and optionally further di- and/or monofunctional alcohols and/or modifying reagents with the aid of acidic catalysts. THEIC is one trifunctional alcohol mentioned. Especially in the case of use in printing inks, paints or coatings, however, the slightly brownish color of the products according to WO 2009/101141 is noticeably disadvantageous.

It was therefore an object of the present invention to provide an optically clear, colorless, uncrosslinked, high-functionality polyether which is soluble in a wide variety of different media and is industrially producible by means of a technically simple and inexpensive process.

It was a further object to provide a high-functionality polyether which, due to its defined structure, combines advantageous properties, such as high functionality, high reactivity, low viscosity and good solubility.

It was a further object of the present invention to provide a process for preparing these high-functionality polyethers.

Surprisingly, the object is achieved by a process in which THEIC and one or more difunctional alcohols and/or modifying reagents are converted with the aid of acidic catalysts.

In the context of this invention, a high-functionality polyether is understood to mean a product which, as well as the ether groups which form the polymer skeleton, has an average of at least four, preferably at least five, more preferably at least six and especially at least eight functionalities in terminal or lateral positions. Functionalities are understood to mean OH groups, and also OH groups which have been reacted with modifying reagents. The polymer skeleton may be linear or branched. There is in principle no upper limit on the number of terminal or lateral functionalities, but products with a very high number of functionalities may have undesired properties, for example a high viscosity or poor solubility. The high-functionality polyetherols of the present invention usually have not more than 100 terminal or lateral functionalities, preferably not more than 50 terminal or lateral functionalities. In a particular embodiment, the functionalities are OH groups. In addition, the functionalities may, however, also be all reaction products of OH groups with modifying reagents, such as the reaction products with monoalcohols, amino alcohols, isocyanates or lactones.

In one embodiment, the high-functionality polyethers are high-functionality, hyperbranched polyethers. Hyperbranched polyethers are understood in the context of this invention to mean uncrosslinked polymer molecules which are both structurally and molecularly inhomogeneous. On the one hand, they may be formed proceeding from a central molecule analogously to dendrimers, but with inhomogeneous chain length of the branches. On the other hand, they may also have linear regions with functional side groups. For a definition of dendrimers and hyperbranched polymers, see also P. J. Flory, J. Am. Chem. Soc. 1952, 74, 2718 and H. Frey et al., Chem. Eur. J. 2000, 6, No. 14, 2499.

"Hyperbranched" in the context of the present invention is understood to mean that the degree of branching (DB), i.e. the mean number of dendritic linkages plus the mean number of end groups per molecule, divided by the sum of the mean number of dendritic, linear and terminal linkages, multiplied by 100, is 10 to 99.9%, preferably 20 to 99%, more preferably 20-95%. "Dendrimeric" in the context of the present invention is understood to mean that the degree of branching is 99.9-100%. For a definition of the degree of branching see H. Frey et al., Acta Polym. 1997, 48, 30.

Color number is understood to mean the Hazen color number, which is determined in accordance with the invention to DIN ISO 6271, ASTM D 1209. The calibration standard used to determine the color impression is a cobalt platinate solution. In a departure from DIN ISO 6271 and ASTM D 1209, in the context of the invention, a 50% by weight solution of the polyether to be determined is analyzed in dimethylacetamide at 23° C.

As difunctional alcohols can ethylene glycol, diethylene glycol, triethylene glycol, 1,2- and 1,3-propanediol, dipropylene glycol, tripropylene glycol, 1,2-, 1,3- and 1,4-butanediol, 1,2-, 1,3- and 1,5-pentanediol, hexanediol, heptanediol, octanediol, nonanediol, decanediol, dodecanediol, cyclopentanediol, cyclohexanediol, cyclohexanedimethanol, bis(4-hydroxycyclohexyl)methane, bis(4-hydroxycyclohexyl)ethane, 2,2-bis(4-hydroxycyclohexyl)propane, difunctional polyether polyols based on ethylene oxide, propylene oxide, butylene oxide or mixtures thereof, or polytetrahydrofuran. It is additionally possible to use branched diols, for example propylene glycol, 2-methylpropanediol, neopentyl glycol, 2-methylbutanediol, 2- or 3-methylpentanediol, 2-ethyl-1,6-hexanediol, 2-ethyl-1,3-hexanediol or 2-butyl-2-ethyl-1,3-propanediol. It will be appreciated that it is also possible to use difunctional alcohols in mixtures. According to the invention, it is also possible to precondense difunctional alcohols to give OH-terminated oligomers and then to add THEIC and optionally the monofunctional alcohol. In this way, it is likewise possible to obtain highly branched polymers with linear block structures.

The ratio of difunctional alcohols to THEIC is determined by the person skilled in the art according to the desired properties of the polyether. In general, the amount of the difunctional alcohol(s) is 0 to 99 mol %, preferably 1-99 mol %, more preferably 1-80 mol % and even more preferably 1-75 mol %, and especially 1 to 70 mol %, based on the total amount of all alcohols in moles. By virtue of alternating addition of diols in the course of the reaction, it is also possible to obtain block copolyethers, for example diol-terminated polyethers.

The modifying reagents used may be compounds which have groups reactive with OH groups. These can be added to the reaction at any time. For instance, it is possible to initially charge THEIC, modifying reagents and optionally difunctional alcohol together and to condense them on in one step, but it is also possible to precondense THEIC alone or together with a difunctional alcohol and to add the modifying reagent during or only after completion of the precondensation.

The modifying reagents used may be molecules which have only one alcohol group (monools), which have at least one acid group, at least one anhydride group, at least one isocyanate group, at least one amino group or at least one phosphonic acid group. The modifying reagents are used only in such amounts that crosslinked products are not obtained.

In addition to the groups reactive with OH groups, the modifying reagents may bear further functional groups, such as mercapto groups, primary, secondary or tertiary amino groups, ester groups, carboxylic acid groups or derivatives thereof, sulfonic acid groups or derivatives thereof, phosphonic acid groups or derivatives thereof, silane groups, siloxane groups, or short- or long-chain alkyl radicals.

For the modification with mercapto groups, it is possible, for example, to use mercaptoethanol. Tertiary amino groups can be obtained, for example, by incorporating alcohols containing amino groups, such as triethanolamine, tripropanolamine, triisopropanolamine, N-methyldiethanolamine, N-methyldipropanolamine or N,N-dimethylethanolamine. By adding dicarboxylic acids, tricarboxylic acids, dicarboxylic esters, for example adipic acid, dimethyl terephthalate or tricarboxylic esters, it is possible to obtain ester groups. In addition, it is possible to obtain ester groups by reacting the OH groups with lactones, especially with caprolactone. By reaction with long-chain alkanols or alkanediols, it is possible to introduce long-chain alkyl radicals. The reaction with alkyl or aryl isocyanates, diisocyanates or oligoisocyanates generates corresponding polyethers having urethane groups.

If the modifying reagents are to be added only in a second step after the precondensation of THEIC and optionally difunctional alcohol, the modifying reagents used are preferably compounds comprising acid, acid halide, anhydride or isocyanate groups, or lactones such as caprolactone. In the case of use of lactones, it is possible to control the length of the ester chains by the amount of lactone used. In a further embodiment, it is also possible to use a plurality of modifying reagents; for example, it is possible to react a modifying reagent in the first step together with THEIC and optionally the difunctional alcohol, and then, in a second step, to add a further modifying reagent to the reaction product from the first step.

In addition, the precondensates can be converted by reaction with alkylene oxides, for example ethylene oxide, propylene oxide, butylene oxide or mixtures thereof, to high-functionality polyether polyols comprising linear polyether chains with adjustable polarity.

When the modifying reagents are used for hydrophobization, preference is given to using monoalkanols having more than 3 and more preferably more than 6 carbon atoms.

Preferably not more than 200 mol %, more preferably not more than 100 mol % and especially preferably not more than 50 mol % of modifying reagent, based on the total amount of THEIC, is added.

To accelerate the reaction, acidic catalysts or catalyst mixtures are added. Suitable catalysts are, for example, acids with a $pK_a$ of less than 2.2; particular preference is given to strong acids.

Examples of acids with a $pK_a$ of less than 2.2 are, for example, phosphoric acid ($H_3PO_4$), phosphorous acid ($H_3PO_3$), pyrophosphoric acid ($H_4P_2O_7$), polyphosphoric acid, hydrogensulfate ($HSO_4^-$), sulfuric acid ($H_2SO_4$), perchloric acid, hydrochloric acid, hydrobromic acid, chlorosulfonic acid, methanesulfonic acid, trichloromethanesulfonic acid, trifluoromethanesulfonic acid, benzenesulfonic acid or p-toluenesulfonic acid.

Further examples of inventive acidic catalysts are acidic ion exchangers or ion exchange resins. "Ion exchangers" is the collective term for solid substances or liquids which are able to absorb positively or negatively charged ions from an electrolyte solution while releasing equivalent amounts of other ions. Preference is given to using solid grains and particles whose matrix has been obtained by condensation (phenol-formaldehyde) or by polymerization (copolymers of styrene and divinylbenzene, and methacrylates and divinylbenzene).

The acidic ion exchangers used in accordance with the invention bear, for example, sulfonic acid groups, carboxylic acid groups or phosphonic acid groups. It is also possible to use ion exchangers which possess a hydrophilic cellulose structure or consist of crosslinked dextran or agarose, and bear acidic functional groups, for example carboxymethyl or sulfoethyl groups. It is also possible to use inorganic ion exchangers, such as zeolites, montmorillonites, palygorskites, bentonites and other aluminum silicates, zirconium phosphate, titanium tungstate and nickel hexacyanoferrate (II). For ion exchangers, see also RÖMPP, Chemisches Lexikon [Chemical Lexicon], Online Version 3.0, or "Ion Exchangers" by F. De Dardel and T. V. Arden, published in Ullmann's Encyclopedia of Industrial Chemistry, Electronic Release 2007. Acidic ion exchangers are obtainable, for example, in solid or dissolved form under the product names Amberlite™, Ambersept™ or Amberjet™ from Rohm and Haas.

Particularly preferred inventive catalysts are sulfuric acid, phosphoric acid, polyphosphoric acid, chlorosulfonic acid, methanesulfonic acid, trichloromethanesulfonic acid, trifluoromethanesulfonic acid, benzenesulfonic acid, p-toluenesulfonic acid or acidic ion exchangers.

Very particular preference is given to sulfuric acid, methanesulfonic acid, trifluoromethanesulfonic acid, p-toluenesulfonic acid or acidic ion exchangers.

The acid is added as a catalyst generally in an amount of 50 ppm to 10% by weight, preferably 100 ppm to 5% by weight and more preferably 1000 ppm to 3% by weight, based on the amount of the alcohol or alcohol mixture used.

When an acidic ion exchanger is used as a catalyst, an amount of 1000 ppm to 30% by weight, preferably of 1-25% by weight, more preferably 1-20% by weight, based on the amount of the alcohol or alcohol mixture used, is typically added. It will be appreciated that the catalysts can also be used in a mixture.

Moreover, it is possible both by addition of the suitable catalyst and by selection of a suitable temperature to control the polycondensation reaction. In addition, it is possible via the composition of the starting components and via the residence time to establish the mean molecular weight of the polymer and its structure.

The reaction is effected typically at a temperature of 0 to 250° C., preferably 60 to 220° C., more preferably at 100 to 200° C. and most preferably at 130 to 180° C., in bulk or in solution. In general, it is possible to use all solvents which are inert toward the particular reactants. When solvent is used, preference is given to using organic solvents, for example decane, dodecane, benzene, toluene, chlorobenzene, xylene, dimethylformamide, dimethylacetamide or solvent naphtha.

In a particularly preferred embodiment, the condensation reaction is performed initially in the presence of water as solvent or solubilizer. The water added for solubilization can be removed in the course of the reaction from the reaction equilibrium to accelerate the reaction, together with the water of reaction additionally released, for example by distillation, optionally under reduced pressure.

The inventive high-functionality polyether polyols are prepared usually within a pressure range of 0.1 mbar to 20 bar, preferably 1 mbar to 5 bar, in reactors which are operated in batchwise operation, semicontinuously or continuously.

Preference is given to performing the reaction in a "one-pot method", in which THEIC and difunctional alcohol and/or modifying reagent and optionally solvent are initially charged in their entirety and the reaction is carried out in a backmixed reactor. However, reactions are also conceivable in a multistage reactor system, for example a stirred tank battery or a tubular reactor. In a preferred alternative embodiment of the present invention, the reaction can be carried out in a kneader, extruder, intensive mixer or paddle dryer.

The reaction can optionally also be carried out with the aid of ultrasound or microwave radiation.

There are various ways of stopping the intermolecular polycondensation reaction. For example, the temperature can be lowered to a range in which the reaction stops and the condensation product is storage-stable.

In addition, the catalyst can be deactivated, for example by adding a basic component such as a Lewis base or an organic or inorganic base.

The aforementioned adjustment of the reaction conditions and optionally the selection of the suitable solvent allow the inventive products to be processed further without further purification after the preparation.

In a further preferred embodiment, the reaction product is purified by stripping, i.e. by removing low molecular weight volatile compounds. For this purpose, the catalyst can be deactivated after the desired conversion has been attained. Subsequently, the low molecular weight volatile constituents, for example solvents, starting monomers, volatile cleavage products, volatile oligomers or cyclic compounds or water are removed by distillation, optionally with introduction of a gas, preferably nitrogen, carbon dioxide or air, optionally under reduced pressure. In a preferred embodiment, the product is freed of volatile constituents in a thin-film evaporator.

In a particularly preferred embodiment, in the case of subsequent modification with modifying reagent, before the modifying reagent is used, the precondensate obtained from THEIC and optionally difunctional alcohol is purified as described above.

Owing to the properties of the starting monomers, it is possible that the reaction can result in condensation products with different structures, which have branches and cyclic units but no crosslinks. The number of reactive groups arises from the properties of the monomers used and the degree of polycondensation, which, according to the invention, should be selected such that the gel point is not attained.

The inventive polyether polyols have glass transition temperatures less than 70° C., preferably less than 50° C., more preferably less than 30° C. and especially less than 0° C.

The high-functionality highly branched polyethers formed by the process according to the invention dissolve readily in various solvents, for example in water, alcohols such as methanol, ethanol, butanol, alcohol/water mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate or propylene carbonate.

A great advantage of the process according to the invention lies in its economic viability. Both the reaction to give the polycondensation product and the reaction of the condensation products to give polyethers with other functional groups or elements can be effected in one reaction apparatus, which is technically and economically advantageous.

The inventive high-functionality highly branched or high-functionality hyperbranched polyetherols can be used in an industrially advantageous manner, inter alia, as adhesion promoters, thixotropic agents, rheology modifiers of polymers, in printing inks or as units for preparing polyaddition or polycondensation polymers, for example in paints, coverings, adhesives, sealants, cast elastomers or foams.

They are suitable especially for producing printing inks, such as flexographic printing inks, gravure printing inks, offset printing inks or screenprinting inks, and for producing print varnishes. More particularly, the inventive polyethers are suitable for producing mobile printing inks, such as flexographic printing inks or gravure printing inks for packaging printing. They can be used for different purposes in printing inks, but especially as binders, optionally also in a mixture with other binders. More particularly, the inventive high-functionality polyethers are suitable in applications in which discoloring is disruptive, as in lacquers, coverings and paints.

The inventive polyethers are formulated for this purpose, for example with suitable solvents, colorants, further binders and additives typical of printing inks. For further details regarding the formulation and production of printing inks with hyperbranched polymers, reference is made explicitly to WO 02/36695 and WO 02/26697, especially to the remarks in WO 02/36695, page 10 line 19 to page 15 line 14, and WO 02/36697, page 7 line 14 to page 10 line 18, and the examples adduced in said documents.

Printing inks which comprise the inventive polyethers have a particularly good adhesion which has been unknown to date on the substrates, especially on metal foils and/or polymer films, and exhibit particularly high color brightness.

The printing inks are therefore also very particularly suitable for producing laminates composed of two or more polymer films and/or metal foils, in which one film is printed with one or more layers of a printing ink and a second film is laminated onto the printed layer. Such composites are used, for example, for producing packaging.

In a further preferred embodiment, the inventive high-functionality polyetherols are used as a binder component, for example in customary coating materials, such as paints, optionally together with other binders having hydroxyl or amino groups, for example with hydroxy (meth)acrylates, hydroxystyryl(meth)acrylates, linear or branched polyesters, polyethers, polycarbonates, melamine resins or urea-formaldehyde resins, together with compounds reactive toward hydroxyl functions and optionally toward carboxyl functions, for example with isocyanates, capped isocyanates, epoxides and/or amino resins, preferably isocyanates, epoxides or amino resins, more preferably with isocyanates or epoxides and most preferably with isocyanates. Such coating materials are described, for example, in "Polyurethane für Lacke and Beschichtungen" [Polyurethanes for Paints and Coatings] by Manfred Bock, Vincentz Verlag, Hannover 1999.

Isocyanates are for example aliphatic, aromatic and cycloaliphatic di- and polyisocyanates having an average NCO functionality of at least 1.8, preferably from 1.8 to 5 and more preferably from 2 to 4, and also their isocyanurates, oxadiazinetriones, iminooxadiazinediones, ureas, biurets, amides, urethanes, allophanates, carbodiimides, uretonimines and uretdiones.

The diisocyanates are preferably isocyanates having 4 to 20 carbon atoms. Examples of customary diisocyanates are aliphatic diisocyanates such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)-cyclohexane(isophorone diisocyanate), 1,3- or 1,4-bis(isocyanatomethyl)cyclohexane or 2,4- or 2,6-diisocyanato-1-methylcyclohexane, and also aromatic diisocyanates such as 2,4- or 2,6-tolylene diisocyanate and isomer mixtures thereof, m- or p-xylylene diisocyanate, 2,4'- or 4,4'-diisocyanatodiphenylmethane and isomer mixtures thereof, 1,3- or 1,4-phenylene diisocyanate, 1-chloro-2,4-phenylene diisocyanate, 1,5-naphthylene diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate.

Mixtures of said diisocyanates may also be present.

Useful polyisocyanates include polyisocyanates having isocyanurate groups, polyisocyanates having uretdione groups, polyisocyanates having biuret groups, polyisocyanates having amide groups, polyisocyanates having urethane or allophanate groups, polyisocyanates comprising oxadiazinetrione groups or iminooxadiazinedione groups, carbodiimide- or uretonimine-modified polyisocyanates of linear or branched $C_4$-$C_{20}$ alkylene diisocyanates, cycloaliphatic diisocyanates having a total of 6 to 20 carbon atoms or aromatic diisocyanates having a total of 8 to 20 carbon atoms, or mixtures thereof.

The di- and polyisocyanates which can be employed preferably have an isocyanate group content (calculated as NCO, molecular weight=42) of 1 to 60% by weight, based on the diisocyanate and polyisocyanate (mixture), preferably 2 to 60% by weight and more preferably 10 to 55% by weight.

Preference is given to aliphatic and/or cycloaliphatic di- and polyisocyanates, examples being the abovementioned aliphatic and/or cycloaliphatic diisocyanates, or mixtures thereof.

Particular preference is given to hexamethylene diisocyanate, 1,3-bis(isocyanato-methyl)cyclohexane, isophorone diisocyanate and di(isocyanatocyclohexyl)methane, very particular preference to isophorone diisocyanate and hexamethylene diisocyanate, and especial preference to hexamethylene diisocyanate.

Preference extends to

1) Isocyanurate group-containing polyisocyanates of aromatic, aliphatic and/or cycloaliphatic diisocyanates. Particular preference here goes to the corresponding aliphatic and/or cycloaliphatic isocyanato isocyanurates and, in particular, to those based on hexamethylene diisocyanate and isophorone diisocyanate. The present isocyanurates are, in particular, tris(isocyanatoalkyl) and/or tris(isocyanatocycloalkyl)isocyanurates, which are cyclic trimers of the diisocyanates, or are mixtures with their higher homologs containing more than one isocyanurate ring. The isocyanato isocyanurates generally have an NCO content of 10% to 30% by weight, in particular 15% to 25% by weight, and an average NCO functionality of 2.6 to 4.5.

2) Uretdione diisocyanates containing aromatically, aliphatically and/or cycloaliphatically attached isocyanate groups, preferably aliphatically and/or cycloaliphatically attached, and in particular those derived from hexamethylene diisocyanate or isophorone diisocyanate. Uretdione diisocyanates are cyclic dimerization products of diisocyanates.

The uretdione diisocyanates can be used in the inventive formulations as a sole component or in a mixture with other polyisocyanates, especially those mentioned under 1).

3) Polyisocyanates containing biuret groups and aromatically, cycloaliphatically or aliphatically attached, preferably cycloaliphatically or aliphatically attached, isocyanate groups, especially tris(6-isocyanatohexyl)biuret or its mixtures with its higher homologs. These polyisocyanates containing biuret groups generally have an NCO content of 18% to 23% by weight and an average NCO functionality of 2.8 to 4.5.

4) Polyisocyanates containing urethane and/or allophanate groups and aromatically, aliphatically or cycloaliphatically attached, preferably aliphatically or cycloaliphatically attached, isocyanate groups, such as may be obtained, for example, by reacting excess amounts of hexamethylene diisocyanate or of isophorone diisocyanate with monohydric or polyhydric alcohols, for example methanol, ethanol, isopropanol, n-propanol, n-butanol, isobutanol, sec-butanol, tert-butanol, n-pentanol, n-hexanol, n-heptanol, n-octanol, n-decanol, n-dodecanol (lauryl alcohol), 2-ethylhexanol, stearyl alcohol, cetyl alcohol, lauryl alcohol, ethylene glycol monomethyl ether, ethylene glycol monoethyl ether, 1,3-propanediol monomethyl ether, cyclopentanol, cyclohexanol, cyclooctanol, cyclododecanol, or mixtures thereof. These polyisocyanates containing urethane and/or allophanate groups generally have an NCO content of 12 to 20% by weight and an average NCO functionality of 2.5 to 4.5.

5) Polyisocyanates comprising oxadiazinetrione groups, derived preferably from hexamethylene diisocyanate or isophorone diisocyanate. Polyisocyanates of this kind comprising oxadiazinetrione groups can be prepared from diisocyanate and carbon dioxide.

6) Polyisocyanates comprising iminooxadiazinedione groups, preferably derived from hexamethylene diisocyanate or isophorone diisocyanate. Polyisocyanates of this kind comprising iminooxadiazinedione groups are preparable from diisocyanates by means of specific catalysts.

7) Carbodiimide-modified and/or uretonimine-modified polyisocyanates.

The polyisocyanates 1) to 7) can be used in a mixture, optionally also in a mixture with diisocyanates.

The isocyanate groups of the di- or polyisocyanates may also be in blocked form. Examples of suitable blocking agents for NCO groups include oximes, phenols, imidazoles, pyrazoles, pyrazolinones, triazoles, diketopiperazines, caprolactam, malonic esters or compounds as specified in the publications by Z. W. Wicks, Prog. Org. Coat. 3 (1975) 73-99 and Prog. Org. Coat 9 (1981), 3-28, by D. A. Wicks and Z. W. Wicks, Prog. Org. Coat. 36 (1999), 148-172 and Prog. Org. Coat. 41 (2001), 1-83 and also in Houben-Weyl, Methoden der Organischen Chemie [Methods of Organic Chemistry], vol. XIV/2, 61 ff. Georg Thieme Verlag, Stuttgart 1963.

Capping or blocking agents are understood to mean compounds which transform isocyanate groups into blocked (capped or protected) isocyanate groups, which then, below a temperature known as the deblocking temperature, do not display the usual reactions of a free isocyanate group. Compounds of this kind with blocked isocyanate groups are commonly employed in dual-cure coating materials or in powder coating materials which are cured to completion via isocyanate curing.

Epoxide compounds are those having at least one, preferably at least two, more preferably from two to ten epoxide group(s) in the molecule.

Suitable examples include epoxidized olefins, glycidyl esters (e.g. glycidyl (meth)acrylate) of saturated or unsaturated carboxylic acids or glycidyl ethers of aliphatic or aromatic polyols. Products of this kind are available commercially in large numbers. Particular preference is given to polyglycidyl compounds of the bisphenol A, F or B type and to glycidyl ethers of polyfunctional alcohols, such as that of butanediol, of 1,6-hexanediol, of glycerol and of pentaerythritol. Examples of polyepoxide compounds of this kind are Epikote® 812 (epoxide value: about 0.67 mol/100 g) and Epikote® 828 (epoxide value: about 0.53 mol/100 g), Epikote® 1001, Epikote® 1007 and Epikote® 162 (epoxide value: about 0.61 mol/100 g) from Resolution, Rütapox® 0162 (epoxide value: about 0.58 mol/100 g), Rütapox® 0164 (epoxide value: about 0.53 mol/100 g) and Rütapox® 0165 (epoxide value: about 0.48 mol/100 g) from Bakelite AG, and Araldit® DY 0397 (epoxide value: about 0.83 mol/100 g) from Vantico AG.

Also useful are compounds containing active methylol or alkylalkoxy groups, especially methylalkoxy groups, such as etherified reaction products of formaldehyde with amines, such as melamine, urea, etc., phenol/formaldehyde adducts, siloxane or silane groups and anhydrides, as described for example in U.S. Pat. No. 5,770,650.

Among the preferred amino resins, which are known and widespread industrially, particular preference goes to using urea resins and melamine resins, such as urea-formaldehyde resins, melamine-formaldehyde resins, melamine-phenol-formaldehyde resins or melamine-urea-formaldehyde resins.

Suitable urea resins are those which are obtainable by reacting ureas with aldehydes and which may optionally be modified.

Suitable ureas are urea, N-substituted or N,N'-disubstituted ureas, such as N-methylurea, N-phenylurea, N,N'-dimethylurea, hexamethylenediurea, N,N'-diphenylurea, 1,2-ethylenediurea, 1,3-propylenediurea, diethylenetriurea, dipropylenetriurea, 2-hydroxypropylenediurea, 2-imidazolidinone (ethyleneurea), 2-oxohexahydropyrimidine (propyleneurea) or 2-oxo-5-hydroxyhexahydropyrimidine (5-hydroxypropyleneurea).

Urea resins can optionally be partly or fully modified, by reaction for example with mono- or polyfunctional alcohols, ammonia and/or amines (cationically modified urea resins) or with (hydrogen)sulfites (anionically modified urea resins), particular suitability being possessed by the alcohol-modified urea resins.

Useful alcohols for the modification are $C_1$-$C_6$ alcohols, preferably $C_1$-$C_4$ alcohol and especially methanol, ethanol, isopropanol, n-propanol, n-butanol, isobutanol and sec-butanol.

Suitable melamine resins are those which are obtainable by reacting melamine with aldehydes and which may optionally be fully or partly modified.

Particularly suitable aldehydes are formaldehyde, acetaldehyde, isobutyraldehyde and glyoxal.

Melamine-formaldehyde resins are reaction products from the reaction of melamine with aldehydes, examples being the abovementioned aldehydes, especially formaldehyde. The resulting methylol groups are optionally modified by etherification with the abovementioned monohydric or polyhydric alcohols. In addition, the melamine-formaldehyde resins may also be modified as described above by reaction with amines, aminocarboxylic acids or sulfites.

The action of formaldehyde on mixtures of melamine and urea or on mixtures of melamine and phenol produces, respectively, melamine-urea-formaldehyde resins and melamine-phenol-formaldehyde resins which can likewise be used in accordance with the invention.

The stated amino resins are prepared by conventional methods.

Examples cited in particular are melamine-formaldehyde resins, including monomeric or polymeric melamine resins and partly or fully alkylated melamine resins, urea resins, e.g., methylolureas such as formaldehyde-urea resins, alkoxyureas such as butylated formaldehyde-urea resins, but also N-methylolacrylamide emulsions, isobutoxymethylacrylamide emulsions, polyanhydrides, such as polysuccinic anhydride, and siloxanes or silanes, such as dimethyldimethoxysilanes, for example.

Particular preference is given to amino resins such as melamine-formaldehyde resins or formaldehyde-urea resins.

In addition, the inventive high-functionality polyethers can also be at least partly esterified or transesterified with α,β-ethylenically unsaturated carboxylic acids or derivatives thereof, for example (meth)acrylic acid or (meth)acrylic esters, so as to form carbonates of the hydroxyl-containing polyesters with the α,β-ethylenically unsaturated carboxylic acids, which can be used, for example, as a monomer or crosslinker in radiation-curable coating materials.

The coating materials in which the inventive high-functionality polyethers, preferably high-functionality polyetherols, are usable as binders may be conventional basecoats, aqueous basecoats, essentially solvent-free and anhydrous liquid basecoats (100% systems), essentially solvent- and water-free solid basecoats (powder coating materials and pigmented powder coating materials) or substantially solvent-free, optionally pigmented powder coating dispersions (powder slurry basecoats). They may be thermally curable, radiation-curable or dual-curable, and may be self-crosslinking or externally crosslinking.

The inventive coating materials are particularly suitable for coating of substrates such as wood, paper, textile, leather, fleece, polymer surfaces, glass, ceramic, mineral building materials such as cement blocks and fiber cement slabs, and especially metals or coated metals.

Coating is accomplished typically by coating with the inventive coating materials in a manner known per se, then drying to remove any solvents present and curing.

The substrates are coated by customary processes known to those skilled in the art, by applying at least one inventive coating material in the desired thickness to the substrate to be coated, and removing the volatile constituents. This operation can, if desired, be repeated once or more than once. The application to the substrate can be effected in a known manner, for example by spraying, troweling, knife coating, brushing, rolling, roller coating or pouring. The coating thickness is generally within a range from about 3 to 1000 g/m² and preferably 10 to 200 g/m².

The high-functionality polyethers formed by the process according to the invention have termination with hydroxyl groups after the reaction, i.e. without further modification. They have good solubility in various solvents, for example in alcohols such as methanol, ethanol, butanol, alcohol/water mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate or propylene carbonate.

The present invention is to be illustrated in detail by the examples which follow.

Analysis and Test Methods:

Molecular weights and molecular weight distributions were analyzed by gel permeation chromatography with a refractometer as a detector. The mobile phase used, unless stated otherwise, was dimethylacetamide; the standard used to determine the molecular weight was polymethyl methacrylate (PMMA).

The DSC analysis was effected with a DSC-7 heat flow calorimeter from Perkin-Elmer. For this purpose, 5-7 mg of the sample were weighed into an aluminum crucible and analyzed within a temperature range from −100 to +100° C. at a heating and cooling rate of 10 K min$^{-1}$. The glass transition temperature ($T_g$) and the melting point (m.p.) were determined from the second heating curve.

The OH number (mg KOH/g) was determined to DIN 53240, Part 2.

EXAMPLE 1 (COMPARATIVE)

Preparation of a Polyether Polyol Based on THEIC According to U.S. Pat. No. 3,293,224

The polycondensation was performed in a 2 l glass flask equipped with stirrer, internal thermometer and distillation unit. The mixture of 522 g of THEIC, 150 g of water and 6.4 g of sulfuric acid (95% by weight) was heated to 80° C. and stirred at standard pressure for 1 h. Then the internal temperature was increased to 130° C., in the course of which the first water of reaction formed and volatile by-products distilled off. The temperature was then increased gradually up to 165° C., and distillate passing over was collected. After 2 h of reaction at 165° C., the hot reaction mixture was poured into an aluminum dish and cooled.

The product had the following characteristics:
$T_g$: 53° C.
GPC: Mn=2500, Mw=20 000 [g/mol]

EXAMPLE 2

Preparation of an Inventive Polyether Polyol Based on THEIC and 1,4-butanediol

The polycondensation was performed in a 2 l glass flask equipped with stirrer, internal thermometer and distillation unit. The mixture of 261.2 g of THEIC, 90.1 g of 1,4-butanediol, 100 g of water and 1 g of sulfuric acid (95% by weight) was heated to 90° C. and stirred at standard pressure for 3 h. Then the internal temperature was increased gradually up to 165° C., the mixture was stirred for 3 h and distillate which passed over was collected. Thereafter, the hot reaction mixture was poured into an aluminum dish and cooled.

The product had the following characteristics:
$T_g$: 30.6° C.
GPC: Mn=2000, Mw=7600 [g/mol]
OH number: 325 mg KOH/g

EXAMPLE 3

Preparation of an Inventive Polyether Polyol Based on THEIC and 1,5-pentanediol

The polycondensation was performed in a 2 l glass flask equipped with stirrer, feed vessel, internal thermometer and distillation unit. The mixture of 522.6 g of THEIC, 200 g of water and 1 g of sulfuric acid (95% by weight) was heated to 90° C. and stirred at standard pressure for 1 h. Then the internal temperature was increased gradually to 150° C. and the water used (200 g) was collected as the distillate. Thereafter, the temperature was lowered to 100° C. and 208.3 g of 1,5-pentanediol were added. The temperature was then increased to 160° C., in the course of which further distillate passed over. After 3 h of reaction time, the hot reaction mixture was poured into an aluminum dish and cooled.

The product had the following characteristics:
$T_g$: 15.6° C.
GPC: Mn=1400, Mw=2700 [g/mol]
OH number: 377 mg KOH/g

EXAMPLE 4

Preparation of an Inventive Polyether Polyol Based on THEIC and 1,10-decanediol

The polycondensation was performed in a 4 l glass flask equipped with stirrer, internal thermometer and distillation unit. The mixture of 783.9 g of THEIC, 441 g of 1,10-decanediol, 200 g of water and 3 g of sulfuric acid (95% by weight) was heated to 90° C. and stirred at standard pressure for 1 h. Then the internal temperature was increased gradually to 170° C. and the distillate formed was removed. After 11 h of reaction time, the temperature was lowered to 120° C., and the mixture was neutralized with 50% aqueous NaOH solution, poured into an aluminum dish and cooled.

The product had the following characteristics:
$T_g$: −20.1° C.
GPC: Mn=1500, Mw=16 400 [g/mol]
OH number: 243 mg KOH/g

EXAMPLE 5

Preparation of an Inventive Polyether Polyol Based on THEIC and Diethylene Glycol The polycondensation was performed in a 4 l glass flask equipped with stirrer, internal thermometer and distillation unit. The mixture of 1045.2 g of THEIC, 424.2 g of diethylene glycol, 300 g of water and 3 g of sulfuric acid (95% by weight) was heated to 90° C. and stirred at standard pressure for 1 h. Then the internal temperature was increased gradually to 170° C., the mixture was stirred for 10 h and distillate passing over was collected. Thereafter, the reaction mixture was cooled to 120° C., neutralized with 50% aqueous NaOH solution, poured into an aluminum dish and cooled.

The product had the following characteristics:
$T_g$: −4° C.
GPC: Mn=2200, Mw=63 500 [g/mol]
OH number: 243 mg KOH/g

EXAMPLE 6

Preparation of an Inventive Polyether Polyol Based on THEIC and Polyethylene Glycol (Molecular Weight 200 g/mol)

The polycondensation was performed in a 2 l glass flask equipped with stirrer, internal thermometer and distillation unit. The mixture of 522.6 g of THEIC, 400 g of polyethylene glycol (Pluriol E 200, BASF SE), 200 g of water and 1 g of sulfuric acid (95% by weight) was heated to 90° C. and stirred at standard pressure for 1 h. Then the internal temperature was increased gradually to 170° C., the mixture was stirred for 3 h and distillate passing over was collected. Thereafter, the reaction temperature was lowered to 120° C., and the product was poured hot into an aluminum dish and cooled.

The product had the following characteristics:
$T_g$: −25° C.
GPC: Mn=2900, Mw=92 000 [g/mol]
OH number: 228 mg KOH/g

EXAMPLE 7

Preparation of an Inventive Polyether Polyol Based on THEIC and Neopentyl Glycol (NPG)

The polycondensation was performed in a 4 l glass flask equipped with stirrer, internal thermometer and distillation unit. The mixture of 522.6 g of THEIC, 624.9 g of NPG, 300 g of water and 3 g of sulfuric acid (95% by weight) was heated to 90° C. and stirred at standard pressure for 2 h. Then the internal temperature was increased gradually to 170° C. over a period of 8 h, in the course of which distillate passing over was collected. Thereafter, the reaction mixture was cooled to 120° C., neutralized with 50% aqueous NaOH solution, poured into an aluminum dish and cooled.

The product had the following characteristics:
$T_g$: −19.4° C.
GPC: Mn=900, Mw=1800 [g/mol]
OH number: 390 mg KOH/g

EXAMPLE 8

Preparation of an Inventive Polyether Polyol Based on THEIC and 2-butyl-2-ethyl-1,3-propanediol (BEPD)

The polycondensation was performed in a 2 l glass flask equipped with stirrer, internal thermometer and distillation unit. The mixture of 392.0 g of THEIC, 240.4 g of BEPD, 200 g of water and 1 g of sulfuric acid (95% by weight) was heated to 90° C. and stirred at standard pressure for 2 h. Then the internal temperature was increased gradually to 170° C. over a period of 8 h, in the course of which distillate passing over was collected. Thereafter, the reaction mixture was cooled to 120° C., neutralized with 50% aqueous NaOH solution, poured into an aluminum dish and cooled.

The product had the following characteristics:
$T_g$: −14.7° C.
GPC: Mn=800, Mw=1600 [g/mol]
OH number: 335 mg KOH/g

EXAMPLE 9

Preparation of an Inventive Polyether Polyol Based on THEIC and Stearyl Alcohol

The polycondensation was performed in a 4 l glass flask equipped with stirrer, internal thermometer and distillation unit. The mixture of 1045.2 g of THEIC, 108.2 g of stearyl alcohol, 300 g of water and 3 g of sulfuric acid (95% by weight) was heated to 90° C. and stirred at standard pressure for 3 h. Then the internal temperature was increased gradually to 150° C. and distillate passing over was collected. After 2 h, the reaction mixture was cooled to 80° C. and the product was poured into an aluminum dish.

The product had the following characteristics:
$T_g$: 46.6° C., m.p. 61.3° C.
GPC: Mn=1000, Mw=2100 [g/mol]
OH number: 350 mg KOH/g

EXAMPLE 10 (COMPARATIVE)

Preparation of a Polyether Polyol Based on Pentaerythritol and Triethylene Glycol According to WO 2009/101141

The polymerization was performed in a 1 l glass flask equipped with a stirrer, reflux condenser and a distillation system with vacuum connection. The mixture of 225.9 g of pentaerythritol (1.66 mol), 249.1 g of triethylene glycol (1.66 mol) and 4.8 g of p-toluenesulfonic acid monohydrate (1% by weight) was evacuated and heated gradually to 200° C. by means of an oil bath at a pressure of 12 mbar. On attainment of the reaction temperature, the reaction mixture was stirred for 15 h. Thereafter, the reaction mixture was left to cool under reduced pressure. The crude product was taken up in 1 l of methanol, and unconverted pentaerythritol was filtered off. For neutralization, 10 g of basic alumina (MP ALUMINA B ACTIVITY SUPER I; 04571, MP Ecochrom) were added to the reaction solution, and the mixture was stirred for 2 h and incubated at −20° C. overnight. After thawing, insoluble constituents were filtered off through Celite and the reaction mixture was then concentrated to dryness on a rotary evaporator at 40° C. and a reduced pressure of down to 22 mbar.

To remove unreacted ethylene glycol, the crude product was purified twice by means of a thin-film evaporator at an oil temperature of 195° C. and a pressure of $1-5*10^{-2}$ mbar. This gave 248 g (52% by weight) of polyether polyol.

The product had the following characteristics:
$T_g$: −32° C.
GPC: Mn=1100, Mw=13 000 [g/mol], measured in hexafluoroisopropanol as the mobile phase.
OH number: 450 mg KOH/g Table 1 shows the solubility behavior of in each case 1 g of the inventive polyether polyols in 100 ml of solvent at room temperature.

TABLE 1

| Polymer from Example | Water | Ethanol | 2-Butanone | Ethyl acetate | Butyl acetate |
|---|---|---|---|---|---|
| 1 (comp.) | + | − | − | − | − |
| 4 | − | − | + | − | − |
| 7 | − | + | + | + | + |
| 8 | − | + | + | − | − |

+: soluble
−: insoluble

The inventive polyether polyols have a much better solubility than comparative polymer 1 (THEIC homopolymer), which is insoluble in many common solvents such as ethanol, 2-butanone or ethyl acetate or butyl acetate. In addition, the inventive polyetherols have a much lower glass transition temperature (Tg), which leads to much better film formation in the case of use in surface coatings.

Table 2 shows the Hazen color numbers of the inventive products, measured as 50% by weight solution in dimethylacetamide. The Hazen color number was determined to DIN ISO 6271, ASTM D 1209. The calibration standard used was a cobalt platinate solution. For the measurement, the products were dissolved in 50% by weight solution in dimethylacetamide, and the solution, before the color number measurement, was passed by means of a disposable syringe through a membrane filter designed as a disposable syringe attachment, brand: Sartorius Minisart RC 25 (pore size 0.45 micrometer).

| Polymer from Example | Color number (Hz) |
|---|---|
| 2 | 29 |
| 3 | 41 |
| 4 | 32 |
| 5 | 96 |
| 6 | 24 |
| 7 | 37 |
| 8 | 71 |
| 9 | 38 |
| 10 (comp.) | 820 |

EXAMPLES 11 (COMPARATIVE) AND 12

Use of the Inventive Polyethers in Paint Formulations

Production of the Paints:

For the production of the paints, the inventive polyether polyol from Example 7 was used to produce an 80% by weight solution in butyl acetate. The OH number of the solution was 312 mg KOH/g.

All paint mixtures were made up with an index of 100 at room temperature, i.e. a stoichiometric ratio of isocyanate to hydroxyl groups. The isocyanate used was Basonat® LR 9046 from BASF SE, a polyisocyanurate based on hexamethylene diisocyanate with an NCO content of approx. 23.0% by weight. The viscosity was adjusted by adding butyl acetate to a flow time of approx. 20 s. The flow time was measured on the basis of ISO 2431 and EN 535 in a DIN 4 cup at room temperature. What is reported is the time from the commencement of flow until the breakage of the liquid thread in seconds.

The paints were knife-coated while wet at room temperature with a 180 μm box-type coating bar onto a steel sheet as a substrate. The paint layer thickness after drying was on average approx. 40 μm.

As Comparative Example 11, a paint which, instead of the polyol from Example 7, comprised exclusively Joncryl 922® from BASF SE, an 80% by weight solution of a polyacrylate polyol in butyl acetate with an OH number of approx. 140 mg KOH/g was considered. Joncryl 922® is a commercial paint raw material. In contrast, in Example 12, 50% by weight of the Joncryl 922® used is replaced by the polyol from Example 7.

Table 3 gives an overview of the composition of the inventive example and of the comparative paint, and Tables 4 and 5 an overview of the comparative properties.

TABLE 3

| | | Example No. | | | |
|---|---|---|---|---|---|
| | | 11 (comp.) | | 12 | |
| | nonvolatile fraction | | solid | | solid |
| Basonat ® LR 9046 | 100.0% | 10.94 | 10.94 | 38.82 | 38.82 |
| Polyol from Example 7 | 80.0% | | | 28.13 | 22.50 |
| Joncryl 922 ® | 80.0% | 30.00 | 24.00 | 28.13 | 22.50 |
| Butyl acetate | 0% | 15.50 | | 30.00 | |
| Mass of paint [g] | | 56.44 | 34.94 | 125.07 | 83.82 |
| Nonvolatile fraction (NVF) | | 61.9% | | 67.0% | |
| Flow time | | 20 s | | 19.7 s | |

The nonvolatile fraction was determined by drying 1 g of the paint mixture or of the feedstock in a forced-air oven at 125° C. for one hour. The residual weight, based on the starting value (=100%), indicates the nonvolatile fraction.

Table 4 shows the determination of the paint hardness via the rise in pendulum damping. For this purpose, the paint, after application, was dried in a climate-controlled room at room temperature (23° C.) and 50% relative air humidity over 4 days, and then at 60° C. for 15 h. The pendulum damping is calculated according to König in number of swings on the basis of DIN EN ISO 1522.

TABLE 4

| | | Example No. | | | |
|---|---|---|---|---|---|
| | | 11 (comp.) | | 12 | |
| | | Layer thickness after drying | | | |
| | | 35-45 μm | | 35-45 μm | |
| Gelation time | (h:min) | 4 h 59 min | | 15 h 36 min | |
| Rise in p.d. | 4 h | — | — | — | — |
| Rise in p.d. | 7 h | 14 | 13 | — | — |
| Rise in p.d. | 24 h | 55 | 54 | 35 | 37 |
| Rise in p.d. | 4 d | 70 | 69 | 112 | 112 |
| Rise in p.d. | 4 d + 15 h at 60° C. | 83 | 81 | 119 | 118 |

Table 5 shows the determination of the paint properties after venting, baking and storage. For this purpose, the paints are left to vent after application at 23° C. and 50% relative air humidity for 15 min, and then baked at 60° C. for 30 minutes. The paints thus produced are stored at 23° C. and 50% relative air humidity for 5 days and then analyzed. The results are reported in Table 5. The acetone double-rub test is effected with an acetone-soaked piece of cottonwool. This was rubbed by hand with double rubs on the paint until the paint had rubbed through to the sheet. The number of double rubs needed for that purpose is reported. At 100 rubs, the test was stopped, i.e. the value 100 indicates that the paint did not rub through in this test.

The cross-cut adhesion was rated according to DIN 53151; the rating 0 represents the best rating, i.e. no visible detachment of the paint.

The scratch resistance was determined by the Scotch-Brite test (scratch test). For this purpose, a fiber web (Scotchbrite, 7448 type S ultrafine) was attached with double-sided adhesive tape to the head of a 500 g fitter's hammer. The hammer was then held at the end of the shaft by two fingers and moved back and forth over the paint film in a line with uniform double strokes, without tipping and without applying additional pressure. The gloss of the surface was measured after 10 and 50 double strokes. After the gloss had been measured, before further stressing, the paint was heated at 60° C. in a forced-air oven for 60 minutes (reflow) and then cooled to room temperature. The gloss was determined transverse to the direction of abrasion. The fiber web was renewed after each stress cycle. The gloss was measured with the Mikro TRI-Gloss measuring instrument at angles of incidence 20° and 60°.

TABLE 5

| | | Example No. | |
|---|---|---|---|
| | | 11 (comp.) | 12 |
| | | Layer thickness | |
| | | 35-45 μm | 35-45 μm |
| Cross-cut | (Rating) | 0 | 0 |
| Acetone test | (Double rubs) | 100 | 100 |
| Scratch test | Gloss (60°) | 98.5 | 101.0 |
| Scratch test | 10 DR (60°) | 21.1 | 35.5 |
| Scratch test | 50 DR (60°) | 13.4 | 32.5 |
| Scratch test | Reflow (60°) | 20.2 | 78.1 |
| Scratch test | Gloss (20°) | 92.6 | 93.6 |
| Scratch test | 10 DR (20°) | 5.8 | 9.2 |
| Scratch test | 50 DR (20°) | 3.0 | 7.5 |
| Scratch test | Reflow (20°) | 10.0 | 61.9 |

Outcome of the Tests:

The use of the inventive polymers leads to an extension in the gel time and hence in the proccessability, and to an improvement in hardness with comparable elasticity and adhesion in the cross-cut test. The use of the inventive polymers likewise leads to a distinct improvement in the scratch resistance (see Tables 4 and 5).

The invention claimed is:

1. A process for preparing uncrosslinked, high-functionality polyethers having a Hazen color number of less than 500, by converting tris(hydroxyethyl) isocyanurate (THEIC) and one or more difunctional alcohols and/or modifying reagents with the aid of acidic catalysts.

2. The process according to claim 1, wherein the uncrosslinked, high-functionality polyether has an average functionality of 4 to 100.

3. The process according to claim 1, wherein the one or more difunctional alcohols is used and the amount of the one or more difunctional alcohols, based on the amount of THEIC and difunctional alcohol, is 1 to 99 mol %.

4. The process according to claim 1, wherein the one or more difunctional alcohols is used and the difunctional alcohols are selected from the group consisting of monoethylene glycol, diethylene glycol, triethylene glycol, 1,2-propanediol, 1,3-propanediol, dipropylene glycol, tripropylene glycol, 1,2-butanediol, 1,3-butanediol, 1,4-butanediol, 1,2-pentanediol, 1,3-pentanediol, 1,5-pentanediol, hexanediol, heptanediol, octanediol, nonanediol, decanediol, dodecanediol, cyclopentanediol, cyclohexanediol, cyclohexanedimethanol, bis(4-hydroxycyclohexyl)methane, bis(4-hydroxycyclohexyl)ethane, 2,2-bis(4-hydroxycyclohexyl) propane, difunctional polyether polyols based on ethylene oxide, propylene oxide, butylene oxide or mixtures thereof, polytetrahydrofuran, 2-methylpropanediol, neopentyl glycol, 2-methylbutanediol, 2- or 3-methylpentanediol, 2-ethyl-1,6-hexanediol, 2-ethyl-1,3-hexanediol, 2-butyl-2-ethyl-1,3-propanediol or mixtures of two or more of these diols.

5. The process according to claim 1, wherein the modifying reagent is used and is an alcohol containing mercapto groups, an alcohol containing amino groups and/or a hydrophobic alcohol.

6. The process according to claim 1, wherein the modifying reagent is used and is a reagent selected from the group consisting of compounds containing acid halide groups, compounds containing isocyanate groups, anhydride-containing compounds, lactones and alkylene oxides.

7. The process according to claim 1, wherein no modifying reagent is used.

8. An uncrosslinked, high-functionality polyether having a Hazen color number of less than 500, obtained by the process according to claim 1.

9. A coating material comprising an uncrosslinked, high-functionality polyether according to claim 8.

10. The process according to claim 2, wherein the one or more difunctional alcohols is used and the amount of the one or more difunctional alcohols, based on the amount of THEIC and difunctional alcohol, is 1 to 99 mol %.

11. The process according to claim 2, wherein the one or more difunctional alcohols is used and the difunctional alcohols are selected from the group consisting of monoethylene glycol, diethylene glycol, triethylene glycol, 1,2-propanediol, 1,3-propanediol, dipropylene glycol, tripropylene glycol, 1,2-butanediol, 1,3-butanediol, 1,4-butanediol, 1,2-pentanediol, 1,3-pentanediol, 1,5-pentanediol, hexanediol, heptanediol, octanediol, nonanediol, decanediol, dodecanediol, cyclopentanediol, cyclohexanediol, cyclohexanedimethanol, bis(4-hydroxycyclohexyl)methane, bis(4-hydroxycyclohexyl)ethane, 2,2-bis(4-hydroxycyclohexyl) propane, difunctional polyether polyols based on ethylene oxide, propylene oxide, butylene oxide or mixtures thereof, polytetrahydrofuran, 2-methylpropanediol, neopentyl glycol, 2-methylbutanediol, 2- or 3-methylpentanediol, 2-ethyl-1,6-hexanediol, 2-ethyl-1,3-hexanediol, 2-butyl-2-ethyl-1,3-propanediol or mixtures of two or more of these diols.

12. The process according to claim 3, wherein the one or more difunctional alcohols is used and the difunctional alcohols are selected from the group consisting of monoethylene glycol, diethylene glycol, triethylene glycol, 1,2-propanediol, 1,3-propanediol, dipropylene glycol, tripropylene glycol, 1,2-butanediol, 1,3-butanediol, 1,4-butanediol, 1,2-pentanediol, 1,3-pentanediol, 1,5-pentanediol, hexanediol, heptanediol, octanediol, nonanediol, decanediol, dodecanediol, cyclopentanediol, cyclohexanediol, cyclohexanedimethanol, bis(4-hydroxycyclohexyl)methane, bis(4-hydroxycyclohexyl)ethane, 2,2-bis(4-hydroxycyclohexyl) propane, difunctional polyether polyols based on ethylene oxide, propylene oxide, butylene oxide or mixtures thereof, polytetrahydrofuran, 2-methylpropanediol, neopentyl glycol, 2-methylbutanediol, 2- or 3-methylpentanediol, 2-ethyl-1,6-hexanediol, 2-ethyl-1,3-hexanediol, 2-butyl-2-ethyl-1,3-propanediol or mixtures of two or more of these diols.

13. The process according to claim 2, wherein the modifying reagent is used and is an alcohol containing mercapto groups, an alcohol containing amino groups and/or a hydrophobic alcohol.

14. The process according to claim 3, wherein the modifying reagent is used and is an alcohol containing mercapto groups, an alcohol containing amino groups and/or a hydrophobic alcohol.

15. The process according to claim 4, wherein the modifying reagent is used and is an alcohol containing mercapto groups, an alcohol containing amino groups and/or a hydrophobic alcohol.

16. The process according to claim 2, wherein the modifying reagent is used and is a reagent selected from the group consisting of compounds containing acid halide groups, compounds containing isocyanate groups, anhydride-containing compounds, lactones and alkylene oxides.

17. The process according to claim 3, wherein the modifying reagent is used and is a reagent selected from the group consisting of compounds containing acid halide groups, compounds containing isocyanate groups, anhydride-containing compounds, lactones and alkylene oxides.

18. The process according to claim 2, wherein no modifying reagent is used.

19. The process according to claim 3, wherein no modifying reagent is used.

* * * * *